(12) United States Patent
Swart

(10) Patent No.: US 7,048,302 B2
(45) Date of Patent: May 23, 2006

(54) ELECTRICAL RELEASE CIRCUIT FOR A PASSENGER PROTECTION SYSTEM

(75) Inventor: Marten Swart, Obertraubling (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 10/297,401

(22) PCT Filed: Jun. 7, 2001

(86) PCT No.: PCT/DE01/02137

§ 371 (c)(1),
(2), (4) Date: May 27, 2003

(87) PCT Pub. No.: WO01/94163

PCT Pub. Date: Dec. 13, 2001

(65) Prior Publication Data

US 2003/0189325 A1    Oct. 9, 2003

(51) Int. Cl.
*B60R 21/32* (2006.01)

(52) U.S. Cl. .................................................... 280/735

(58) Field of Classification Search ................ 280/735; 180/282; 701/45, 46
See application file for complete search history.

(56) References Cited

U.S. PATENT DOCUMENTS

| | | | |
|---|---|---|---|
| 5,184,845 A * | 2/1993 | Omura | 280/735 |
| 6,036,225 A | 3/2000 | Foo et al. | |
| 6,682,094 B1 * | 1/2004 | Laituri et al. | 280/735 |
| 2002/0147533 A1 * | 10/2002 | Foo et al. | 701/45 |
| 2003/0197356 A1 * | 10/2003 | Fischer | 280/735 |
| 2005/0057030 A1 * | 3/2005 | Fischer et al. | 280/743.2 |

FOREIGN PATENT DOCUMENTS

| | | |
|---|---|---|
| DE | 198 27 427 A1 | 12/1999 |
| EP | 0 982 199 A1 | 3/2000 |
| JP | 9-240416 | 9/1997 |
| JP | 11-301392 | 4/1998 |
| JP | 11-91501 | 4/1999 |
| WO | WO 00/32445 | 6/2000 |

\* cited by examiner

*Primary Examiner*—Faye M. Fleming
(74) *Attorney, Agent, or Firm*—Morrison & Foerster LLP

(57) ABSTRACT

The invention relates to a passenger protection system which is provided with a safing switch (20). If only one ignition stage (2) of a passenger protection airbag which can be ignited in two stages is ignited by a control device (6), the safing switch being closed, a circuit module (16) output (46) that is parallel to the safing switch is switched to a signal mode corresponding to the closed safing switch. In this way, the second ignition stage (4) can then be ignited by the control device (6) even when the safing switch is no longer closed.

10 Claims, 1 Drawing Sheet

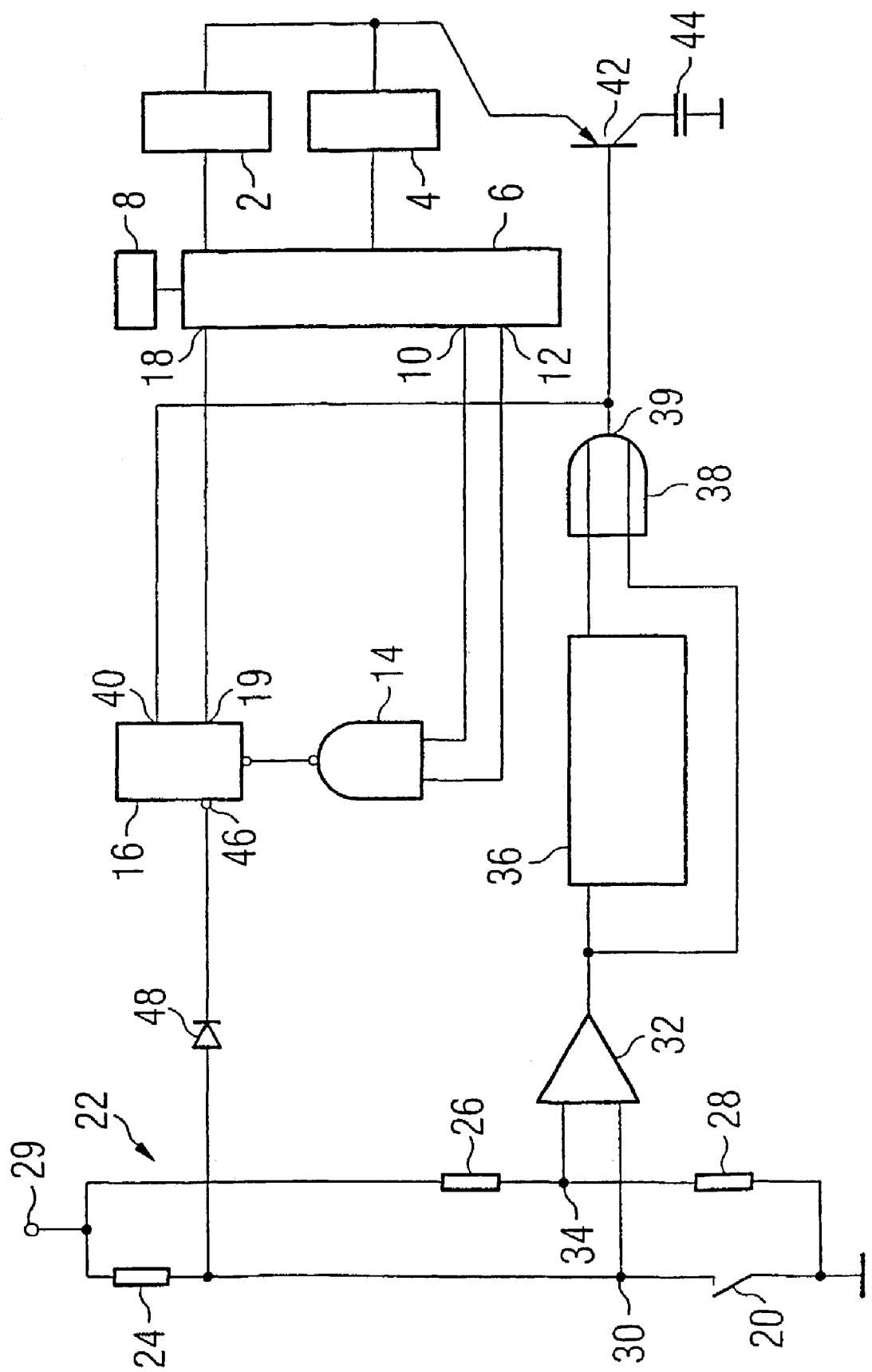

ELECTRICAL RELEASE CIRCUIT FOR A PASSENGER PROTECTION SYSTEM

CLAIM FOR PRIORITY

This application claims priority to Application No. 10028352.7 which was filed in the German language on Jun. 8, 2000.

TECHNICAL FIELD OF THE INVENTION

The invention relates to a method for releasing the firing capability of at least two firing stages which can be fired separately in a vehicle occupant protection system and electric release circuit for a vehicle occupant protection system.

BACKGROUND OF THE INVENTION

In motor vehicle occupant protection systems, airbags are being increasingly used which have two gas generators which are each equipped with their own firing stage. In this way, the inflation of the airbag can be adapted better to the respective requirements. If the second inflation stage is not required to protect the persons to be protected when there is an accident or if its firing even constitutes a hazard, it is possible for the second stage not to be fired directly after the first stage. However, so that helpers or rescue service personnel are not put in danger as a result of the second stage firing, it is expedient to fire the second stage automatically after the first stage, but at a time at which the person to be protected is no longer placed in danger. For it to be at all possible to fire a firing stage, a safety switch must be closed. Such a safety switch generally closes even when there are decelerations below a threshold value at which it is necessary to inflate the airbag.

If, as in the case described above, firing the second firing stage takes place with a long delay with respect to that of the first firing stage, the safety switch is opened again so that it is no longer possible to fire the second stage.

SUMMARY OF THE INVENTION

According to an aspect of the invention, a method is provided for releasing the firing capability of at least two firing stages which can be fired separately in a vehicle occupant protection system.

According to another aspect of the invention, an electric release circuit for a vehicle occupant protection system having at least two firing stages is provided. The invention can be applied in particular for motor vehicle occupant protection systems.

An object of the invention is to provide a remedy for the above-mentioned problem.

The switching device provided according to an aspect of the invention ensures that as soon as the safety switch is closed and the controller evaluates the output signal of the accident sensor in such a way that only one firing stage has to be fired in order to protect a person, during a time which is long enough to fire the second stage with such a delay that the person is no longer put in danger, a signal state is maintained which corresponds to the closed safety switch.

The controller can in this way never independently simulate closing the safety switch but instead it is only possible to maintain the signal state of a previously closed safety switch during the predetermined time period.

The invention can be used advantageously wherever systems, in particular protection systems, are triggered with multiple stages in response to external influences and are protected by a safety switch which releases the operation of the protection system.

BRIEF DESCRIPTION OF THE DRAWINGS

The invention is described below with reference to the drawings, in which:

FIG. 1 illustrates a block circuit diagram of a motor vehicle occupant protection system which contains the release circuit according to the invention.

DETAILED DESCRIPTION OF THE INVENTION

According to FIG. 1, two firing stages 2 and 4 are connected to outputs of an electronic controller 6. The firing stages 2, 4 are assigned to gas generators (not illustrated) which inflate an airbag. An accident sensor 8 which can contain, for example, one or more acceleration sensors is connected to the controller 6. Reset outputs 10 and 12 are connected to the inputs of a NAND element 14 whose output is connected to the reset input 15 of a logic circuit module 16 which is embodied, for example as a D-flip flop. A signal output 18 of the controller 6 is connected to a signal input 19 of the circuit module 16.

A safety switch 20 is contained in a bridge circuit 22 which has resistors 24, 26 and 28 and is connected to a voltage source 29. A tap 30 of the bridge circuit 22 is connected to an input of a comparator 32 whose other input is connected to the other tap 34 of the bridge circuit 22.

A timing element 36 whose output is connected to one input of an OR element 38, whose other input is connected to the output of the comparator 32 in parallel with the timing element 36, is connected to the output of the comparator 32.

The output of the OR element 38, which, as will be explained below, forms a safety signal output 39, is connected to a control and data input 40 of the circuit module 16 and to the control input of a switch 42 which is embodied, for example, as a transistor. The switch 42 is located between a firing capacitor 44 and the firing stages 2 and 4. An output 46 of the circuit module 16 is connected via a diode 48 to the tap 30 of the bridge circuit 22.

The design and function of the described component and the basic function of an airbag system are known per se and are therefore not explained.

The interaction of the circuit elements is described below:

The safety switch 20 is embodied in such a way that it closes when there is a deceleration above a threshold value, this deceleration being below the deceleration which leads to triggering of the airbag. Closing the safety switch 20 leads to the signal level to one input of the comparator 32 changing, as a result of which its output level goes, for example, to a high level and the timing element 36 starts. The expiration time period of the timing element is, for example, approximately 100 ms, this time period being advantageously selected such that it is longer than the longest delay with which the second firing stage, for example the firing stage 4, is fired with respect to the firing stage 2 if both firing stages are fired for optimum protection of a vehicle occupant.

During the time period during which the timing element 36 is activated, a high level signal is present at the corresponding input of the OR element 38. As long as the safety switch 20 is closed, a high level signal is also present at the other input of the OR element 38. Thus, when the safety switch 20 is closed (the closing period may be very short under certain circumstances) and/or when the timing element 36 is still running, a safety signal which switches the switch 42 to the conducting state is present at the safety signal output 39, so that the firing voltage which is supplied by the firing capacitor 44 is present at corresponding inputs of the firing stages 2 and 4. The firing stages 2 and 4 are thus released for firing, which takes place if the controller 6 generates corresponding firing signals after the output signals of the accident sensor 8 are evaluated. When the safety switch 20 is open and the timing element 36 has expired, the safety signal at the safety signal output 39 ends, and the switch 42 opens, so that the firing stages 2, 4 can normally no longer be fired.

If the controller 6 evaluates the output signals of the accident sensor 8 to the effect that only the first firing stage 2 has to be fired to provide personal protection, said controller 6 generates, at the signal output 18, a clock signal which is fed to the signal input 19 of the circuit module 16. The safety signal which is present at this time is present at the data input 40 of the circuit module 16. This signal state leads to the situation in which a low level appears at the output 46 of the circuit module 16 and is connected in parallel with the safety switch, which low level places the tap 30 in the same level state as the closed safety switch 20, as a result of which the safety signal is retained at the output of the OR element 38. The switch 42 thus remains closed so that the controller 6 can fire the second firing stage 4 with sufficient delay in order to avoid placing the person who is protected by the firing of only the first firing stage in danger. This firing can take place although the firing switch 20 is open again and the timing element 36 has expired.

The circuit module 16 is reset by a reset pulse which the controller 6 generates with sufficient delay after the firing of the first firing stage at its output 10, or by a general system reset pulse which the controller switch generates at its output 12. The NAND element 14 feeds these pulses to the reset input of the circuit module 16. The circuit module 16, which is embodied for example as a D-flip flop, thus forms a self-locking circuit which is actuated by signals at its inputs 19 and 40 and maintains its output level until a reset takes place. The diode 48 serves to isolate the bridge circuit 22 from the circuit module 16 in such a way that only the low level at the output 46 and/or the low level which is brought about by the closing the safety switch 20 are effective.

The described release circuit which releases the firing capability of the firing stages 2, 4 by firing pulses which are generated by the controller 6 ensures that the release can be prolonged beyond the period during which the safety switch 20 is closed or the period which is predefined by the timing element 36, only if the safety switch 20 is initially closed and the controller 6 determines that only one of the two firing stages is allowed to be fired in order to protect a vehicle occupant. The circuit component 16 then places its output 46, which is connected in parallel with the safety switch 20, at a level which corresponds to the closed safety switch (for example to ground) so that a signal which corresponds to the closed safety switch 20 is present at the output of the OR element 38.

The described circuit can be modified in various ways. The firing stages 2 and 4 can be assigned separate firing energy sources which are released by separate switches. The comparator 32 is not absolutely necessary; likewise, the NAND gate can be dispensed with if only one reset is provided. The circuit module 16 which forms a logic circuit can be constructed in such a way that it contains a separate timing element which resets it automatically after a predetermined time period.

The invention claimed is:

1. A switch for arming an activation stage following a first of at least two activation stages that can be activated separately in an occupant protection system subsequent to a passage of time required to activate all activation stages in the event of an accident, when, for the protection of occupants in an accident, only one of the activation stages is activated, comprising:

a safety switch;

at least one crash sensor; and a control device that creates control signals, depending on the output signal of the crash sensor, for activation of at least one of the activation stages, whether simultaneously or staggered in time, wherein the safety switch is set to a physical parameter and opens upon exceeding a threshold at which protection of the occupants by means of an occupant protection system is no longer necessary, so that the activation stages are switched in such a manner that they can only be activated with the presence of a signal corresponding to a closed safety switch at a safety signal output of a timing element indicating a run time set previously that is connected downstream of the safety switch and with the presence of an activation signal assigned to the activation switches, and a switching device is provided that is connected to the safety signal output and to the control device that, with the presence of a safety signal at the safety signal output and upon activation of a control device causing only one activation stage at the safety signal output, and causes a signal condition corresponding to a closed safety switch beyond the run time.

2. The circuit as claimed in claim 1, wherein the switching device has a circuit component with a control input, a signal input and an output, the control input being connected to the safety signal output, the signal input being connected to the controller, the output being located in parallel with the safety switch and the output assuming a signal stage, which corresponds to the closed safety switch after a safety signal which appears at the safety signal output when the safety switch closes, is applied to the control input and a clock signal, which is generated by the controller when it is necessary to fire only one firing stage, is applied to the clock input.

3. The circuit as claimed in claim 2, wherein a timing element, which is triggered by closing the safety switch, is connected downstream of the safety switch, an output of the timing element is connected to an input of an OR element whose other input is connected to the safety switch and whose output forms the safety signal output.

4. The circuit as claimed in claim 3, wherein the safety switching is contained in a branch of a bridge circuit, and a comparator is provided, wherein one input of which comparator is connected to the safety switch and to the output of the circuit component, and the other input of which comparator is connected to another branch of the bridge circuit, and the output of circuit component is connected to the input of the timing element and to the one input of the OR element.

5. The circuit as claimed in claim 2, wherein a diode is provided between the output of the circuit module and the bridge circuit.

6. The circuit as claimed in claim 2, wherein the circuit component is formed by a D-flip-flop.

7. The circuit as claimed in claim 1, wherein the switching device has a reset input.

8. The circuit as claimed in claim 7, wherein the reset input is connected to an output of a NAND element whose inputs are connected to resetting outputs of the controller.

9. A method for arming an activation stage following a first of at least two activation stages that can be activated separately in an occupant protection system, subsequent to a passage of time required to activate all of the activation stages in the event of an accident when, for the protection of the occupants in an accident, only one activation stage is activated, wherein the arming of the activation stages is triggered by a safety signal located at an output of a timing element, indicating a run time set previously, that is connected downstream of a safety switch and the duration of this safety signal is extended beyond the run time.

10. A method for arming an activation stage in an occupant protection system, wherein:

the activation stage to be armed follows a first of at least two activation stages that can be activated separately;

the arming follows an accident in which, for the protection of the occupants, only one activation stage is activated;

the arming is subsequent to a passage of an amount of time sufficient to activate all of the activation stages;

the arming is triggered by a safety signal generated by a timing element that is connected downstream of a safety switch; and the safety signal is generated by the timing element after the passage of a predetermined amount of time following an activation of the safety switch.

* * * * *